June 3, 1969 B. C. DE LOACH, JR 3,448,415

TUNABLE CRYSTAL DIODES

Filed Aug. 1, 1968

INVENTOR
B. C. DeLOACH, Jr.
BY
Sylvan Sherman
ATTORNEY

United States Patent Office 3,448,415

Patented June 3, 1969

3,448,415

TUNABLE CRYSTAL DIODES

Bernard C. De Loach, Jr., Murray Hill, N.J., assignor to Bell Telephone Laboratories, Incorporated, Murray Hill and Berkeley Heights, N.J., a corporation of New York Continuation-in-part of application Ser. No. 200,212, June 5, 1962. This application Aug. 1, 1968, Ser. No. 749,441

Int. Cl. H01p *1/20*

U.S. Cl. 333—98 13 Claims

ABSTRACT OF THE DISCLOSURE

In a crystal diode, the self-inductance of the crystal contacting element is advantageously employed to resonate with the diode's self-capacitance. Recognizing that in an inhomogeneous electromagnetic field the inductance of a conductive member varies as a function of its position within the field, tuning is accomplished by introducing an asymmetry in the geometry of the diode contacting element, and providing means for rotating the diode about some reference axis. It is an advantage of the invention that the diode can be tuned in situ and under normal operating conditions.

This application, relating to tunable solid state devices for use in electromagnetic wave transmission systems, is a continuation-in-part of my copending application Ser. No. 200,212, filed June 5, 1962.

BACKGROUND OF THE INVENTION

In the design and construction of high frequency solid state amplifiers, oscillators and switches employing crystal diodes, the impedance of the diode cartridge has been advantageously incorporated into, and made an integral part of the associated circuitry. For example, in United States Patent 3,050,689, issued Aug. 21, 1962, there is disclosed an amplifier structure in which the cartridge is recessed into the waveguide walls, leaving the crystal contacting element as the sole inductance remaining to resonate with the capacitance associated with the diode.

As pointed out in an article entitled, "A Study of the Optimum Design of Wide Band Parametric Amplifiers and Up-Converters," by G. L. Matthaei published in the January 1961 issue of the Institute of Radio Engineers Transactions on Microwave Theory and Techniques, it is desirable, in a parametric amplifier, to series resonate the diode at the operating frequency. However, since the inductance of the contacting element is essentially a constant in prior art diodes, the practice has been to try a number of such diodes until one is found which is resonant at the particular frequency of interest. Such a procedure is obviously unsatisfactory, being both time consuming and expensive.

It is, therefore, the broad object of the invention to introduce a variable component of inductance in solid state devices.

SUMMARY OF THE INVENTION

Recognizing that in an inhomogeneous electromagnetic field the reactance of a conductive wire is a function of its position within that field, a variable component of reactance is obtained in crystal devices, in accordance with the present invention, by introducing an asymmetry in the geometry of the crystal contacting element with respect to a given reference axis. Means are then provided for rotating the crystal cartridge about the given axis while the diode is within the electromagnetic field, thereby changing the physical location of all or of a portion of the contacting element with reference to the electromagnetic field. This has the effect of changing the inductance of the contacting element, thus permitting one to tune the diode either manually or automatically.

The invention can be utilized in connection with any solid state device which employs a contacting element whose length is such as to introduce a meaningful inductance at the operating frequency. This includes a contacting element which makes an ohmic connection with a crystal wafer, as well as a contacting element which makes a rectifying connection with a crystal wafer.

It is an advantage of the invention that manufacturing tolerances for solid state devices can be eased since each device can now be tuned in situ by the user. More particularly, the device can be tuned with power applied and under normal operating conditions, as during the "cooling" operation encountered when low noise operation is desired.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
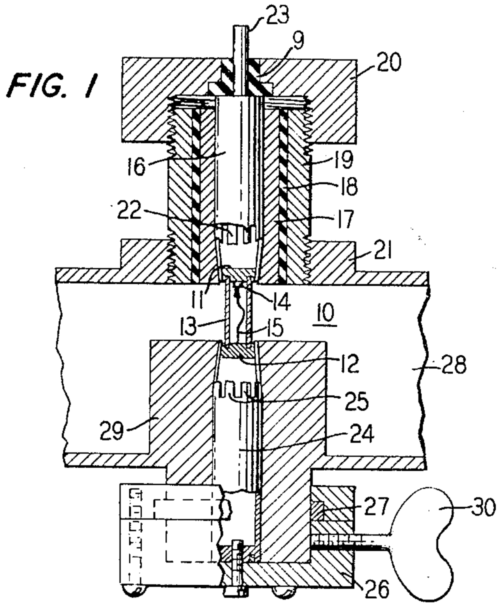
FIG. 1 is a cross-sectional view of the invention showing details of a crystal diode, including the diode cartridge and the cartridge holder.

Referring to FIG. 1, there is shown in cross section a typical crystal diode assembly, in accordance with the invention, including a crystal cartridge containing therein a crystal wafer and its contacting element, and a crystal cartridge holder. It is essentially the same assembly as was disclosed in the above-identified United States patent, modified in accordance with this invention, as will be described in detail hereinbelow.

The diode 10 is similar to the type described in United States Patent 2,956,160, issued on Oct. 11, 1960, to W. M. Sharpless. It comprises a cartridge having a pair of conductive end members 11 and 12 spaced apart and supported by means of a cylindrical quartz sleeve 13. A crystal wafer 14, mounted on the center post of end 11, is contacted by a contacting element 15, which, in turn, is connected to the center post of end 12.

The crystal cartridge holder comprises a pair of chuck assemblies. The upper chuck assembly comprises a silvered chuck 16, a conductive chuck holder 17, an insulating sleeve 18 and a threaded conductive sleeve 19. Chuck 16 extends through a hole in chuck holder 17 and is in contact therewith along its length. Chuck holder 17, in turn, is supported within sleeve 19 and conductively insulated therefrom by means of the insulating sleeve 18. Holder 17 conductive sleeve 19 and insulating sleeve 18 form, in addition, a low impedance bypass capacitor for high frequency currents.

Chuck 16 is protectively covered and held in position by a lock-cap 20 which threads onto sleeve 19. The latter is threaded onto the upper wall 21 of the waveguiding structure 28.

The lower end of chuck 16 has a plurality of spring-like fingers 22 with which to hold end 11 of the crystal cartridge. The other end of chuck 16 is conductively connected by means of a wire 23 to a source of biasing potential. An insulating bushing 9 conductively insulates wire 23 from cap 20.

The lower chuck 24 extends up through a hole in the bottom 29 of the waveguiding structure 28 and is in contact therewith along its length. The upper end of chuck 24 has a plurality of spring-like fingers 25 with which to hold end 12 of the crystal cartridge. The lower end of chuck 24 is connected to a control knob 26 which is held in position relative to the waveguiding structure 28 by means of a collar 27. This leaves knob 26 free to rotate but transversely fixed in position with respect to the waveguide 28 to produce a pure rotation. A locking screw 30 is provided to lock knob 26 (and diode 10) in position after it has been adjusted.

In operation, a diode, of a type to be described in greater detail hereinbelow, is inserted into the cartridge holder and the control knob 26 is released by loosening the locking screw 30. The control knob 26 is rotated until an indication of proper tuning is obtained. The latter is conveniently obtained by monitoring the signal output from waveguide 28, and rotating diode 10 until the output at the frequency of interest is a maximum. The control knob is then locked in position by screw 30.

To insure that the diode will rotate when knob 26 is rotated, a slot can be placed in end 12 of the diode, which slot will engage one of the fingers 25.

Self-tuning a diode requires that the self-inductance of the diode contacting element be designed to resonate the diode capacitance at the frequency of interest. To achieve this condition, however, would require a very careful control of the diode parameters and, hence, is a relatively expensive procedure. The present invention avoids the necessity of carefully controlling the manufacturing tolerances of crystal diodes by introducing a geometric asymmetry in the contacting element which permits the self-inductance of the contacting element to be varied, thereby compensating for slight deviations from the desired value. All that is necessary is that the magnitude of the self-inductance of the contacting elements be sufficient to resonate the diode capacitance at at least one orientation of the element within the wavepath. In this regard, it should be noted that the specific manner in which the inductance varies as a function of angular displacement is of no consequence insofar as the present invention is concerned.

Figure 2:
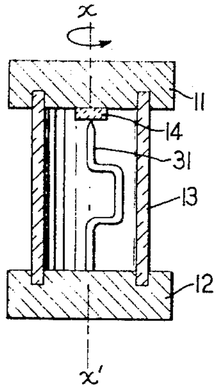
FIGS. 2, 3 and 4 show various crystal diode arrangements having contacting elements which depart from cylindrical symmetry with respect to a given axis of rotation.
Figure 3:
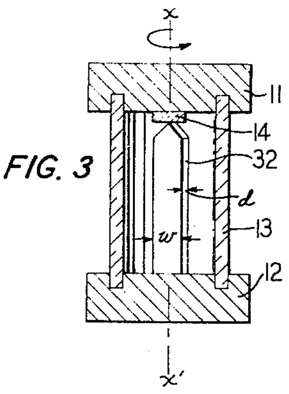
Figure 4:
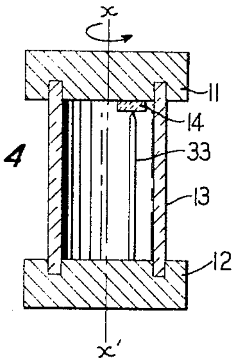

FIGS. 2, 3 and 4 are illustrative of some of the ways in which geometric asymmetry can be achieved in the crystal contacting element. In the following descriptions, similar identification numerals will be used for corresponding parts.

In FIG. 2, there is illustrated a crystal diode including the cartridge comprising end members 11 and 12, quartz sleeve 13, and crystal wafer 14. In this embodiment the contacting element 31 has a pronounced U-shaped portion along its length. Accordingly, as the crystal cartridge is rotated (as indicated by the arrow) about its axis x–x′, the relative position of the U-shaped portion within the waveguiding structure 28 varies. Since the transverse field configuration in a wavepath is typically different in different portions of the path, the effective inductance of the contacting element 31 also varies.

In FIG. 3, the contacting element 32 is a metallic ribbon having a rectangular cross section whose wide dimension $w$ is larger than its narrow dimension $d$. As the cartridge is rotated within the wavepath, the aspect of the contacting element exposed to the incident wave energy varies as a function of the rotation, thereby varying its effective inductance.

In the embodiment of FIG. 4, the crystal wafer 14 and the contacting element 33 are mounted off-center so that rotating the cartridge varies the relative position of the entire contacting element within the wavepath.

Figure 5:
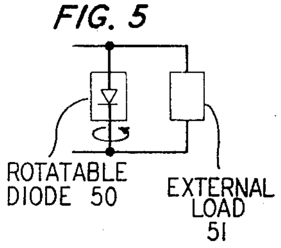
FIG. 5 shows, schematically, a diode, in accordance with the invention, connected in parallel with an external load.

Thus far the situation wherein the diode is adjusted to produce a condition of self-resonance at the operating frequency has been considered. There is, however, another situation, shown schematically in FIG. 5, wherein a rotatable diode 50, of the type described hereinabove, is used to resonate with an external load 51 which includes a reactive component at the operating frequency.

As is known, a series resonant circuit appears inductive at a frequency above its resonant frequency and capacitive at a frequency below its resonant frequency. Accordingly, when the reactive component of load 51 is an inductive reactance, diode 50 is rotated to a position such that its self-resonant frequency is higher than the operating frequency by a sufficient amount to produce a capacitive reactance equal in amplitude to the inductive reactance of the load at the operating frequency. Similarly, when the reactive component of the load is capacitive, the diode is rotated to a position such that its self-resonant frequency is below the operating frequency by a sufficient amount to produce a resonating inductive reactance at the operating frequency.

The various configurations described above are merely illustrative of the many possible configurations that can be used to practice the invention. For example, any or all of the asymmetrical features shown in the illustrative embodiments can be combined in a single embodiment to enhance the effect as conditions require. More generally, however, any marked departure from cylindrical symmetry can be utilized so that the rotation of the crystal cartridge about its longitudinal axis (or any other reference axis) produces a change in the effective reactance of the contacting element.

It should be noted that while the illustrative embodiment described above refers to a crystal diode, the invention can be practiced in connection with any type of device in which a contacting element is employed whose length is such as to introduce a meaningful inductance at the operating frequency. It is, therefore, to be understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination:

means forming a wavepath supportive of electromagnetic wave energy having an inhomogeneous field distribution;

a crystal diode comprising a crystal wafer and, in contact therewith, a conductive contacting element having a marked departure from cylindrical symmetry with respect to a given axis;

said device being mounted within, and extending across said wavepath;

the magnitude of the self-inductance of said contacting element at at least one orientation of said element within said wavepath being sufficient to resonate the capacitance of said device at a prescribed frequency;

and purely rotational means for rotating said device about said axis to said one orientation thereby resonating said device at said frequency.

2. The combination according to claim 1 wherein said contacting element makes an ohmic connection with said wafer.

3. The combination according to claim 1 wherein said contacting element makes a rectifying connection with said wafer.

4. The combination according to claim 1 wherein said contacting element extends coaxially along said axis over a portion of its length and is displaced with respect to said axis over the remaining portion of its length forming a U-shaped region.

5. The combination according to claim 1 wherein said contacting element extends along said axis and has a rectangular cross section whose wide dimension is greater than its narrow dimension.

6. The combination according to claim 1 wherein said entire contacting element extends in a direction substantially parallel to said axis and is displaced therefrom.

7. The combination according to claim 1 wherein said crystal wafer and said contacting element define a point contact diode.

8. The combination according to claim 1 wherein said crystal wafer includes a rectifying junction and said contacting element makes an ohmic connection with said crystal wafer.

9. The combination according to claim 1 wherein;

said wavepath is a conductively bounded rectangular waveguide;

said crystal diode includes a cartridge assembly comprising a pair of spaced cylindrical conductive end members that are received through opposite broad sides of said waveguide;

said crystal wafer element is conductively connected to one of said end members;

said contacting element is conductively connected to the other of said end members;

and wherein said contacting element extends across the narrow dimension of said waveguide and contacts said crystal wafer.

10. The combination according to claim 1 wherein;

said diode is connected across an impedance including a reactive component;

and wherein said prescribed frequency is different than the operating frequency.

11. The combination according to claim 10 wherein;

said component is capacitive;

and said prescribed frequency is below said operating frequency.

12. The combination according to claim 10 wherein;

said component is inductive;

and said prescribed frequency is above said operating frequency.

13. The combination according to claim 1 wherein said prescribed frequency is equal to the operating frequency.

References Cited

UNITED STATES PATENTS

| | | | |
|---|---|---|---|
| 2,956,160 | 10/1960 | Sharpless. | |
| 3,127,566 | 3/1964 | Lombardo | 330—4.9 |
| 3,050,689 | 8/1962 | De Loach | 333—98 |

HERMAN KARL SAALBACH, *Primary Examiner.*

C. BARAFF, *Assistant Examiner.*

U.S. Cl. X.R.

329—161; 330—4.9; 333—73